United States Patent
Sato et al.

[11] Patent Number: 6,134,910
[45] Date of Patent: Oct. 24, 2000

[54] ABSORPTION REFRIGERATOR

[75] Inventors: Takehiro Sato; Akira Maruyama; Hiroshi Kamiya, all of Nagoya, Japan

[73] Assignee: Paloma Industries, Limited, Aichi, Japan

[21] Appl. No.: 09/129,246

[22] Filed: Aug. 5, 1998

[30] Foreign Application Priority Data

Sep. 20, 1997 [JP] Japan .................................. 9-273907

[51] Int. Cl.[7] ............................ F25B 15/12; F25B 15/00
[52] U.S. Cl. ................................................ 62/484; 62/485
[58] Field of Search ............................ 62/476, 484, 485, 62/494

[56] References Cited

U.S. PATENT DOCUMENTS

| | | | |
|---|---|---|---|
| 2,210,496 | 8/1940 | Peltier | 62/494 |
| 4,791,790 | 12/1988 | Tongu | 62/476 |
| 4,872,319 | 10/1989 | Tongu | 62/141 |
| 4,926,659 | 5/1990 | Christensen et al. | 62/476 |
| 5,048,308 | 9/1991 | Hisajima et al. | 62/476 |
| 5,794,456 | 8/1998 | Ishiguro et al. | 62/497 |
| 5,802,866 | 9/1998 | Ishiguro | 62/324.2 |
| 5,875,649 | 3/1999 | Ishiguro et al. | 62/484 |

*Primary Examiner*—William Doerrler
*Attorney, Agent, or Firm*—Pearson & Pearson

[57] ABSTRACT

An absorption refrigerator which is capable of effectively using energy without a necessity of enlarging the size thereof, the absorption refrigerator having a structure that a cylindrical wall is provided for an inner wall portion raised because of a stepped portion of the bottom surface of a double-tube unit so that a refrigerant retainer for accumulating water allowed to downwards flow along the outer surface of a cold-water tube is formed. A refrigerant-circulating passage is connected to the bottom surface of the refrigerant retainer. Another end of the refrigerant-circulating passage is connected to a refrigerant supply passage. When a pump is operated, water in the refrigerant retainer is supplied to a water-receiving pan so as to again be sprayed to the outer surface of the cold-water tube.

11 Claims, 3 Drawing Sheets

ABSORPTION REFRIGERATOR

BACKGROUND OF THE INVENTION

1. Field of the Invention

The present invention relates to an absorption refrigerator having an evaporator and an absorber formed integrally with a double tube thereof.

2. Description of the Related Art

Hitherto, an absorption refrigerator has been known which has a structure that liquid refrigerant is sprayed to the outer surface of an internal tube of a double tube which is stood erect so as to be evaporated during downward flow. Then, steam of the refrigerant is absorbed by absorbing solution sprayed to the outer surface of the outer tube. Thus, the evaporator and the absorber are formed integrally with each other. The foregoing structure enables the size to be reduced because the evaporator and the absorber are formed integrally with each other. Therefore, the overall size of the absorption refrigerator can be reduced.

However, the above-mentioned structure encounters a fact that a portion of the liquid refrigerant, which has been sprayed to the outer surface of the internal tube and which cannot be evaporated during downward flow, is as it is mixed with the absorbing solution allowed to downwards flow along the inner surface of the outer tube. Thus, a satisfactory refrigerating effect cannot be obtained. Therefore, energy is wasted. Even if the liquid refrigerant in a quantity which can be evaporated and which can be obtained theoretically from the heating area of the outer surface of the internal tube is sprayed, the structure in which the liquid refrigerant is allowed to downwards flow along the outer surface of the internal tube which is stood erect inhibits effective use of the overall outer surface of the internal tube. In the foregoing case, the overall quantity of the liquid refrigerant cannot perfectly be evaporated. If the overall quantity of the sprayed liquid refrigerant is attempted to be evaporated, a considerably large margin is required in addition to the heating area obtained theoretically. Thus, there arises a problem in that the size of the apparatus cannot be reduced.

SUMMARY OF THE INVENTION

An object of the present invention to provide an absorption refrigerator which is capable of overcoming the above-mentioned problems and effectively using energy without a necessity of enlarging the size thereof.

According to one aspect of the present invention, there is provided an absorption refrigerator incorporating:

a circulating tube for circulating a heat medium;

an outer tube disposed coaxially with a portion of an outer surface of the circulating tube;

a refrigerant-spraying unit for spraying liquid refrigerant to the outer surface of the circulating tube in a chamber formed between the circulating tube and the outer tube; and an absorbing-solution-spraying unit for spraying absorbing solution which absorbs refrigerant to the inner surface of the outer tube in the chamber so that the heat medium which is circulated in the circulating tube is cooled by dint of evaporation of the liquid refrigerant sprayed to the outer surface of the circulating tube, and the absorbing solution sprayed to the inner surface of the outer tube absorbs steam of the refrigerant, the absorption refrigerator comprising:

a refrigerant retainer for accumulating the liquid refrigerant which has not been evaporated despite spray of the liquid refrigerant from the refrigerant-spraying unit such that the liquid refrigerant is not mixed with the absorbing solution, a refrigerant-circulating passage serving as a passage through which the liquid refrigerant in the refrigerant retainer is circulated to the refrigerant-spraying unit; and a pump provided for the refrigerant-circulating passage and arranged to convey the liquid refrigerant to the refrigerant-spraying unit.

The absorption refrigerator according to the present invention may further comprise means for preventing contact with the circulating tube so that the contact of the absorbing solution sprayed by the absorbing-solution-spraying unit with the circulating tube is prevented.

The absorption refrigerator according to the present invention may further comprise means for preventing contact with the refrigerant retainer so that the contact of the absorbing solution sprayed by the absorbing-solution-spraying unit with the refrigerant retainer is prevented.

The absorption refrigerator according to the present invention may have a structure that the pump is also employed as a power source for conveying the liquid refrigerant condensed and generated by a condenser to the refrigerant-spraying unit.

The absorption refrigerator according to the present invention may further comprise:

a refrigerant tank for separating a portion of the liquid refrigerant condensed and generated by the condenser from an absorbing operation cycle so as to accumulate the portion of the liquid refrigerant; and supply means which supplies the liquid refrigerant in the refrigerant tank to the refrigerant-spraying unit so as to return the liquid refrigerant to the absorbing operation cycle.

The absorption refrigerator according to the present invention may have a structure that the pump is also employed as a power source for the supply means.

The absorption refrigerator having the above-mentioned structure and according to the present invention is arranged to spray the liquid refrigerant to the outer surface of the circulating tube and spray the absorbing solution to the inner surface of the outer tube. The liquid refrigerant is evaporated on the outer surface of the circulating tube and derives heat from the heat medium which is circulated through the circulating tube when the liquid refrigerant is evaporated so that the heat medium is cooled. Steam of the evaporated refrigerant is immediately absorbed by the absorbing solution sprayed to the inner surface of the outer tube. Since the evaporator and the absorber are formed integrally because of the double tube structure, the size of the apparatus can be reduced. The liquid refrigerant which has not been evaporated though it has been sprayed to the outer surface of the circulating tube is conveyed to the refrigerant-spraying unit through the refrigerant-circulating passage so as to again be sprayed. Since the structure is arranged such that the liquid refrigerant which has not been evaporated is repeatedly sprayed, waste of energy can be prevented and the liquid refrigerant in a quantity larger than the quantity which can be evaporated can positively be sprayed. Thus, the wettability and the like on the outer surface of the circulating tube can be improved and thus the heating area can effectively be used. As a result, design having a small margin is sufficient to obtain a sufficiently large quantity of evaporation.

The absorption refrigerator having the above-mentioned structure and according to the present invention encounters a fact that the absorbing solution is heated because the absorbing solution generates heat of absorption when it absorbs steam of the refrigerant. However, the provided means for preventing contact with the circulating tube to prevent the contact of the sprayed absorbing solution with the circulating tube prevents easy conduction of heat of the absorbing solution to the circulating tube. Thus, deterioration in the cooling efficiency can be prevented.

The absorption refrigerator having the above-mentioned structure and according to the present invention comprises the means for preventing contact with the refrigerant retainer such that the contact of the absorbing solution with the refrigerant retainer is prevented. Therefore, heat of the absorbing solution cannot easily be conducted from the liquid refrigerant in the refrigerant retainer to the circulating tube. Moreover, the liquid refrigerant cannot easily be evaporated in the refrigerant retainer. As a result, deterioration in the cooling efficiency can be prevented.

The absorption refrigerator having the above-mentioned structure and according to the present invention has the structure that the liquid refrigerant condensed and generated in the condenser is conveyed to the refrigerant-spraying unit so as to be sprayed to the outer surface of the circulating tube. Since the pump for conveying the liquid refrigerant in the refrigerant retainer to the refrigerant-spraying unit is also used as the power source, the structure can be simplified.

The absorption refrigerator having the above-mentioned structure and according to the present invention comprises the refrigerant tank for separating a portion of the liquid refrigerant condensed and generated in the condenser from the absorbing operation cycle so as to reserve the portion of the liquid refrigerant. As a result of the foregoing structure, the ratio of the quantity of the refrigerant which is contained in the absorbing solution for use in the absorbing operation cycle can be changed. Therefore, the foregoing ratio is changed in accordance with the temperature of outer air or the temperature of the absorbing solution so that an optimum ratio corresponding to the temperature is maintained and the refrigerating performance is improved. To raise the ratio of the quantity of the refrigerant which is contained in the absorbing solution for use in the absorbing operation, the liquid refrigerant in the refrigerant tank must be returned to the absorbing operation cycle. If the liquid refrigerant is directly mixed with the absorbing solution, the refrigerating effect deteriorates and thus energy is wasted. The structure according to the present invention in which the liquid refrigerant is supplied to the refrigerant-spraying unit so as to be evaporated enables energy to effectively be used.

The absorption refrigerator having the above-mentioned structure and according to the present invention has the structure that the pump is also employed as the power source for the supply means. Therefore, the structure of the apparatus can be simplified.

Other objects, features and advantages of the invention will be evident from the following detailed description of the preferred embodiments described in conjunction with the attached drawings.

DESCRIPTION OF THE PREFERRED EMBODIMENT

An embodiment of an absorption refrigerator will now be described.

Figure 1:
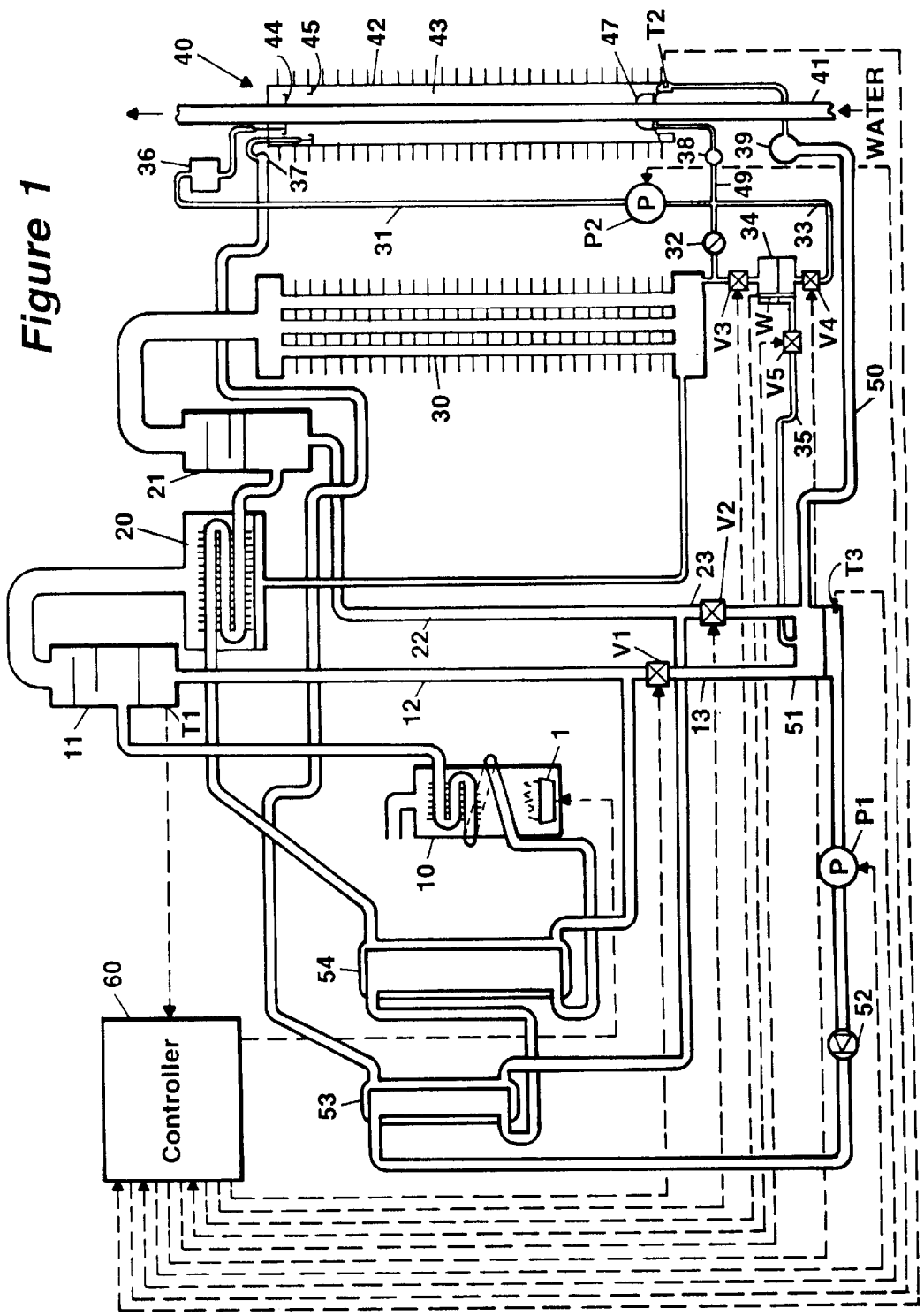
FIG. 1 is a schematic view showing the structure of an embodiment of an absorption refrigerator according to the present invention.

FIG. 1 is a schematic view showing the structure of an embodiment of an absorption refrigerator according to the present invention. The absorption refrigerator according to this embodiment incorporates a high-temperature regenerator 10 for heating a low concentration of lithium bromide solution (hereinafter simply called "low-concentration solution", "intermediate-concentration solution" and "high-concentration solution" depending on the concentration of lithium bromide) by using heat of combustion performed by a burner 1. Moreover, the absorption refrigerator incorporates a first vapor-liquid separator 11 for separating the low-concentration solution heated by the high-temperature regenerator 10 into steam and the intermediate-concentration solution; and a low-temperature regenerator 20 for again heating the intermediate-concentration solution supplied from the first vapor-liquid separator 11 through the high-temperature heat exchanger 54, heating being performed using steam supplied from the first vapor-liquid separator 11. Moreover, the absorption refrigerator incorporates a second vapor-liquid separator 21 for separating the intermediate-concentration solution heated by the low-temperature regenerator 20 into steam and the high-concentration solution; a condenser 30 for cooling and liquefying steam supplied from the second vapor-liquid separator 21; and a double-tube unit 40 for evaporating water supplied from the condenser 30 and causing steam of water supplied from the condenser 30 with the high-concentration solution supplied from the second vapor-liquid separator 21 through a low-temperature heat exchanger 53. A dilute-solution tank 51 for accumulating the low-concentration solution, a pump P1 for supplying the low-concentration solution in the dilute-solution tank 51 to the high-temperature regenerator 10 and a check valve 52 for preventing a counter flow are disposed in a solution-circulating passage 50 formed from the double-tube unit 40 to the high-temperature regenerator 10. The low-concentration solution is subjected to heat exchange in the low-temperature heat exchanger 53 and the high-temperature heat exchanger 54, and then heated by the high-temperature regenerator 10.

Note that fans or the like for cooling the condenser 30 and the double-tube unit 40 are provided.

The high-temperature regenerator 10 and the low-temperature regenerator 20 are fin-tube heat exchanger arranged to heat the lithium bromide solution which flows in the tube. Therefore, the quantity of the lithium bromide solution required in the apparatus can be reduced as compared with the quantity required for a boiler type heat exchanger. Moreover, an excellent heat efficiency can be realized when the solution is heated. Thus, the operation can quickly be started.

In the solution-circulating passages 12 and 22 for circulating the solution supplied from the first vapor-liquid separator 11 and the second vapor-liquid separator 21, overflow preventive pipes 13 and 23 connected to the dilute-solution tank 51 are formed by branching the solution-circulating passages 12 and 22. The overflow preventive pipes 13 and 23 are provided with electromagnetic valves V1 and V2 for opening/closing the passages. Moreover, the first vapor-liquid separator 11 is provided with a temperature sensor T1 for detecting the temperature of the intermediate-concentration solution. The dilute-solution tank 51 is provided with a temperature sensor T3 for detecting the temperature of the low-concentration solution in the dilute-solution tank 51.

The condenser 30 has a structure that a plurality of cylindrical pipes, which are stood erect, penetrate a plurality of fins. Thus, steam supplied from the second vapor-liquid separator 21 is cooled by air supplied from the fins (not shown) so as to be condensed into water. The refrigerant supply passage 31 for supplying water condensed by the condenser 30 to the double-tube unit 40 is provided with a pressure-reducing valve 32 for reducing the pressure and a pump P2 for supplying water at a predetermined flow rate. Moreover, a branched passage 33 branched upstream of the pressure-reducing valve 32 is formed. The branched passage 33 is provided with a refrigerant tank 34 for separating water supplied from the condenser 30 from the operation cycle and accumulating water, the refrigerant tank 34 being disposed between the electromagnetic valves V3 and V4 and joined to the downstream of the pressure-reducing valve 32. The refrigerant tank 34 is provided with a solution-level detection sensor W for detecting the quantity of water in the refrigerant tank 34. Moreover, a diluting passage 35 for establishing the connection between the refrigerant tank 34 and the dilute-solution tank 51 is formed. The diluting passage 35 is provided with an electromagnetic valve V5 for opening/closing the passage.

The double-tube unit 40 is composed of a cold-water tube 41 serving as a passage for circulating water which is circulated in an interior unit (not shown) and an outer tube 42 formed coaxially with a portion of the outer surface of the cold-water tube 41 such that the outer tube 42 penetrates the plural fins. Moreover, an evaporating and absorbing chamber 43 is formed between the cold-water tube 41 and the outer tube 42. A water-receiving pan 44 having a plurality of spraying openings for spraying water to the outer surface of the cold-water tube 41 is provided on the outer surface of the cold-water tube 41, the water-receiving pan 44 being disposed in the upper portion of the evaporating and absorbing chamber 43. Water spraying nozzles for dripping water on the water-receiving pan 44 is disposed above the water-receiving pan 44. Similarly, an annular solution-receiving pan 45 having a plurality of spraying openings for spraying the high-concentration solution to the inner surface of the outer tube 42 is provided for the inner surface of the outer tube 42. Solution-spraying nozzles for dripping the high-concentration solution on the solution-receiving pan 45 is disposed above the solution-receiving pan 45.

A portion of the cold-water tube 41 in the evaporating and absorbing chamber 43 is formed into a grooved pipe having lengthwise and breadthwise grooves formed on the outer surface thereof. Since the grooved pipe is employed, water is able to easily penetrate the outer surface. Thus, the downward flow speed is reduced and water can easily be spread. Similarly, the inner surface of the outer tube 42 is, for example, short-blasted so as to be roughened. Thus, the solution is able to easily penetrate the surface so as to reduce the downward flow speed and easily spread the solution.

Figure 2:
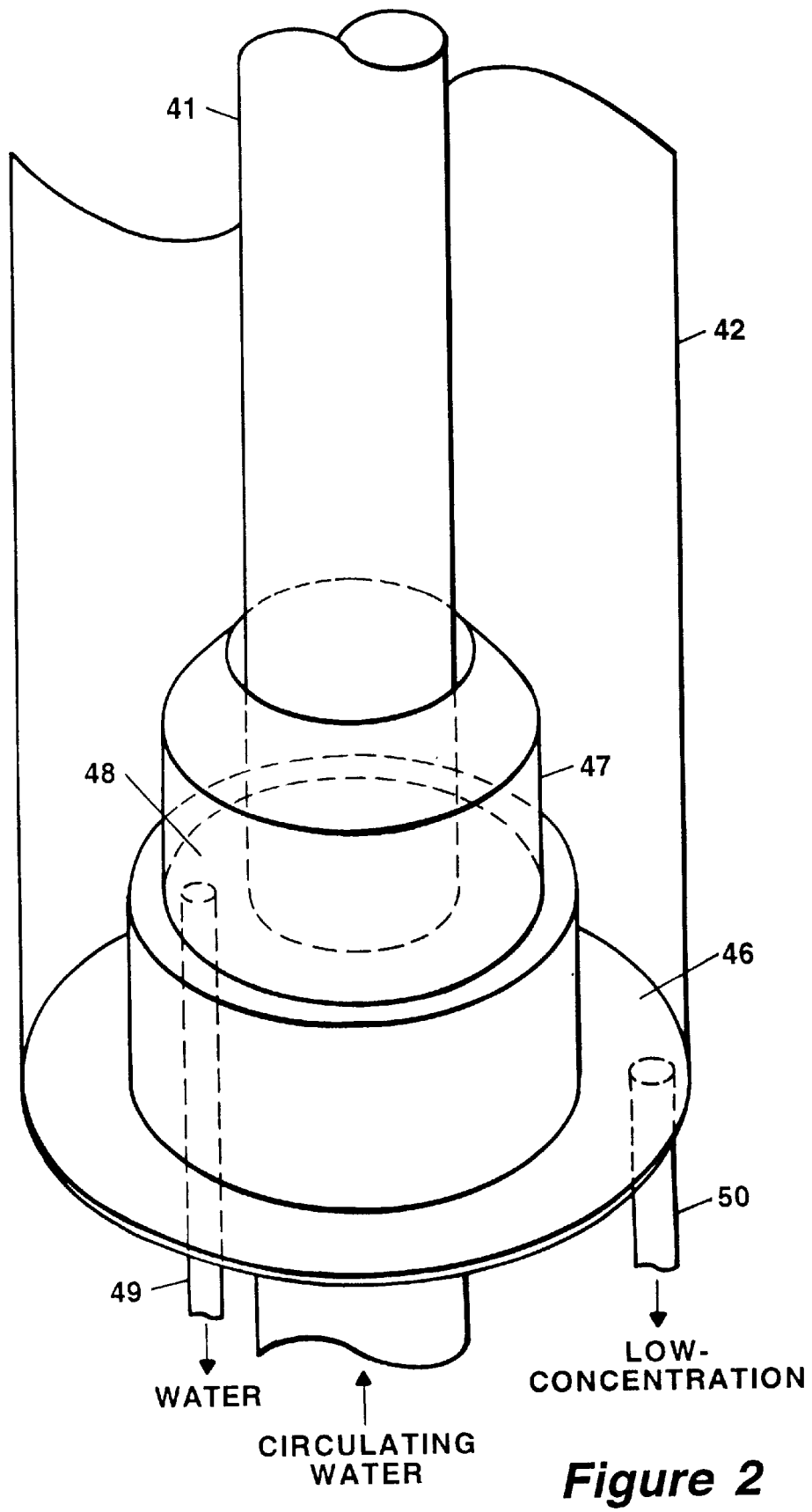
FIG. 2 is a perspective view showing a lower portion of a double-tube unit.
Figure 3:
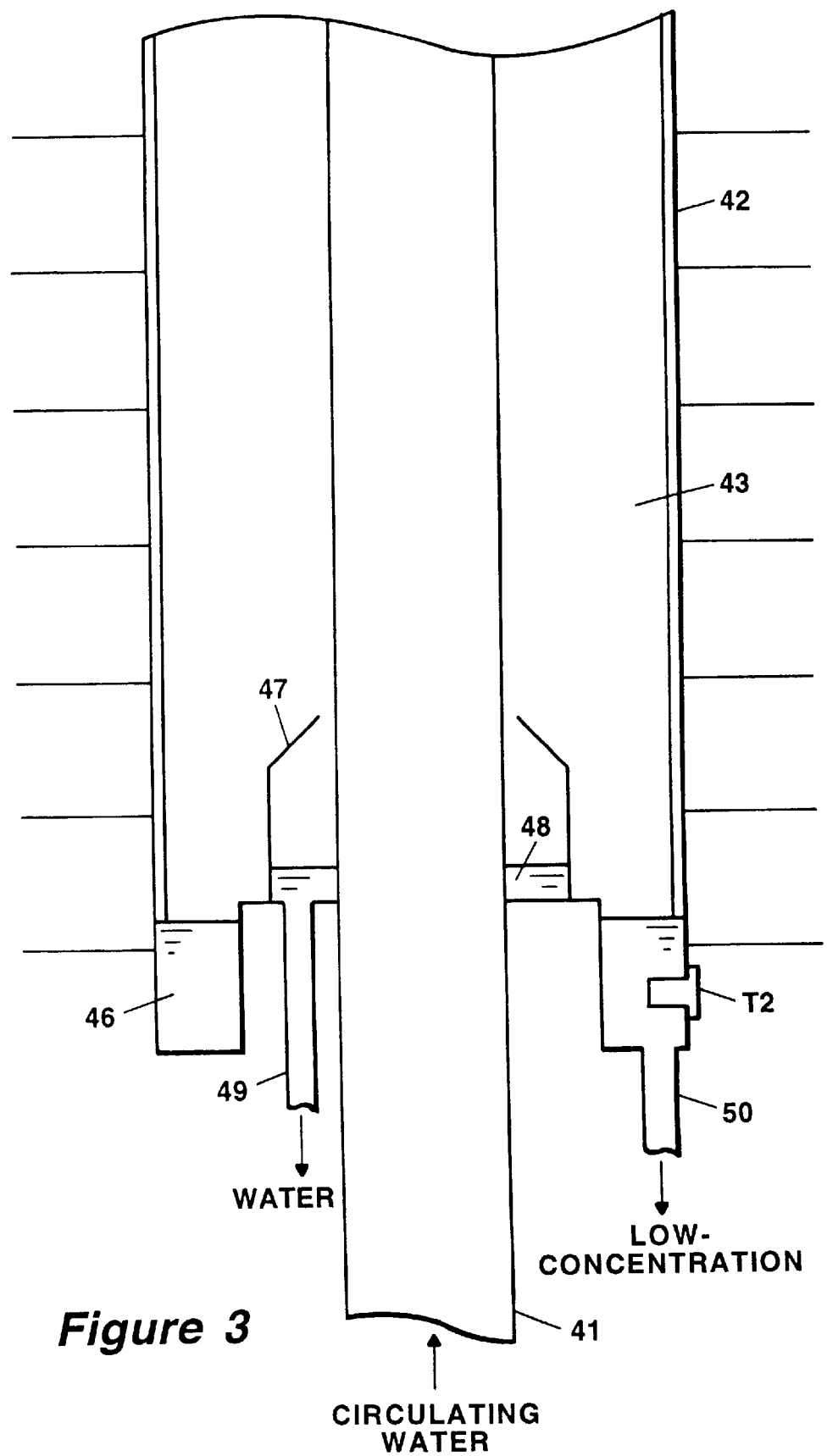
FIG. 3 is a cross sectional view showing a lower portion of the double-tube unit.

As shown in FIG. 2 and FIG. 3 which are a perspective view and a cross sectional view, respectively, the outer periphery of the bottom surface of the double-tube unit 40 is lowered because of a stepped portion. Thus, a solution retainer 46 for accumulating the low-concentration solution which has flowed downwards along the inner surface of the outer tube 42 is formed. The solution retainer 46 is provided with a temperature sensor T2 for detecting the temperature of the solution. Moreover, the solution-circulating passage 50 is connected to the bottom surface of the solution retainer 46 so that the accumulated low-concentration solution is allowed to flow to the dilute-solution tank 51. A cylindrical wall 47 is formed in a portion of the inner surface raised because of the stepped portion so that a refrigerant retainer 48 for accumulating water which has flowed downwards along the outer surface of the cold-water tube 41 is formed. A refrigerant-circulating passage 49 is connected to the bottom surface of the refrigerant retainer 48. Another end of the refrigerant-circulating passage 49 is connected to the refrigerant supply passage 31. When the pump P2 has been operated, water in the refrigerant retainer 48 is supplied to the water-receiving pan 44. Then, water is again sprayed to the outer surface of the cold-water tube 41. That is, since the refrigerant retainer 48 is formed, mixture of water which has not been evaporated with the low-concentration solution is prevented so as to enable water to again be sprayed. Since the above-mentioned structure is employed with which water, which has not been evaporated, is repeatedly sprayed, water can positively be sprayed in a quantity larger than a quantity which can be evaporated and which can theoretically be obtained from the heating area of the outer surface of the cold-water tube 41. Therefore, the wettability on the outer surface of the cold-water tube 41 can be improved and thus the heating area can effectively be used. As a result, the evaporation efficiency can be improved. Since the structure is formed in such a manner that the low-concentration solution in the solution retainer 46 is not brought into directly contact with the cold-water tube 41, heat of the low-concentration solution cannot easily be conducted to the cold-water tube 41. Consequently, deterioration in the cooling efficiency can be prevented. Moreover, direct contact of the low-concentration solution in the solution retainer 46 with the refrigerant retainer 48 is prevented so that heat of the low-concentration solution is not easily conducted to water in the refrigerant retainer 48. As a result, heat of the low-concentration solution cannot easily be conducted to the cold-water tube 41 through water in the refrigerant retainer 48. Moreover, evaporation of water by dint of the refrigerant retainer 48 can be prevented.

Note that the absorption refrigerator according to this embodiment has a plurality of the double-tube units 40 (not shown). Water which is supplied to the double-tube unit 40 is distributed by a water-distributing portion 36, while the high-concentration solution is distributed by a solution-distributing portion 37. Water supplied from the double-tube unit 40 is joined in a water-joining portion 38. The low-concentration solution which has absorbed steam is joined in the solution-joining portion 39. Therefore, a plurality of the pumps P2 are not required.

The absorption refrigerator according to this embodiment is provided with a controller 60 for receiving signals from various sensors and producing outputs of operating signals for various actuators. The main control which is performed by the controller 60 will now be described.

1. Control for Preventing Overflow

Since the pressure is reduced in the sequential order as the first vapor-liquid separator 11, the second vapor-liquid separator 21 and the evaporating and absorbing chamber 43 during the refrigerating cycle, the lithium bromide solution can smoothly be circulated by dint of the difference in the pressure. Since the foregoing pressure levels are substantially the same immediately after the operation has been started, the lithium bromide solution cannot smoothly be circulated. Thus, there is apprehension that the lithium bromide solution overflows in the first vapor-liquid separator 11 and the second vapor-liquid separator 21. In this case, the lithium bromide solution is undesirably introduced into the passages for steam. To prevent the above-mentioned problem, the electromagnetic valves V1 and V2 are opened when the operation is started to cause the solution in the first vapor-liquid separator 11 and that in the second vapor-liquid separator 21 to be introduced into the dilute-solution tank 51. At a moment in time at which the temperature sensor T3 has detected that the temperature of the solution in the dilute-solution tank 51 has been raised to a predetermined first temperature level, that is, at a moment in time at which the pressure in the first vapor-liquid separator 11 has sufficiently be raised, the electromagnetic valve V1 is closed. At a moment in time at which the temperature of the solution has been raised to a predetermined second temperature level, that is, at a moment in time at which the pressure in the second vapor-liquid separator 21 has sufficiently be raised, the electromagnetic valve V2 is closed. Thus, circulation is performed after the difference in the pressure has been made to be sufficiently large so that overflow in the first vapor-liquid separator 11 and the second vapor-liquid separator 21 can be prevented.

2. Control of Concentration

The refrigerating performance can be improved in proportion to the average concentration of the lithium bromide solution which is circulated in the apparatus. If the temperature of the solution is low, lithium bromide is undesirably crystallized in the case where the concentration is high. Therefore, it is preferable that the apparatus is operated at a high concentration at which the lithium bromide is not crystallized. Since the temperature of the solution is changed by dint of outside air or the like, the temperature of the solution is directly detected by the temperature sensor T2. The concentration control is performed such that the average concentration of the lithium bromide solution in the apparatus is changed in accordance with the detected temperature. In this embodiment, water which does not concern the cycle operation is accumulated in the refrigerant tank 34. The quantity of water in the refrigerant tank 34 is enlarged/reduced so that the average concentration of the solution is changed. The quantity of water in the refrigerant tank 34 is enlarged by closing the electromagnetic valve V4 and by opening the electromagnetic valve V3. A predetermined quantity of water is maintained by closing both of the electromagnetic valves V3 and V4. The quantity is reduced by closing the electromagnetic valve V3 and by opening the electromagnetic valve V4. Moreover, the water level in the refrigerant tank 34 is detected by the solution-level detection sensor W so as to enlarge/reduce the quantity of water which corresponds to the temperature detected by the temperature sensor T2. If the temperature detected by the temperature sensor T2 is not lower than a reference temperature level, the water level is made to be the maximum level. Thus, the average concentration is raised. When the detected temperature is lower than a predetermined temperature level, the water level is made to be an intermediate water level. Thus, the concentration is diluted. As a result, high concentration of the lithium bromide solution can be maintained with which lithium bromide solution is not crystallized even if the temperature of outer air is changed.

The operation of the absorption refrigerator according to this embodiment will now be described. When the operation has been started, the pumps P1 and P2 are operated and the burner 1 is ignited so that combustion is started. Then, the electromagnetic valves V1 and V2 are opened. At a moment in time at which the temperature detected by the temperature sensor T3 has been raised to the predetermined first temperature level, the electromagnetic valve V1 is closed. At a moment in time at which the temperature has been raised to a predetermined second temperature level, the electromagnetic valve V2 is closed. The control for preventing overflow is performed as described above.

The low-concentration solution heated by the high-temperature regenerator 10 is, by the first vapor-liquid separator 11, separated into steam and the intermediate-concentration solution. The temperature of the separated intermediate-concentration solution is lowered by the high-temperature heat exchanger 54, and then supplied to the low-temperature regenerator 20. Then, the intermediate-concentration solution is again heated with steam supplied from the first vapor-liquid separator 11, and then separated into steam and the high-concentration solution by the second vapor-liquid separator 21. The temperature of the separated high-concentration solution is lowered by the low-temperature heat exchanger 53, and then dripped through the solution spraying nozzles on the solution-receiving pan 45. Then, the high-concentration solution is sprayed along the inner surface of the outer tube 42 through the plural spraying openings formed in the solution-receiving pan 45.

Steam is cooled in the condenser 30 by dint of air supplied from the fan (not shown) so that steam is condensed and converted into water. When the electromagnetic valve V3 is opened, water supplied from the condenser 30 is accumulated in the refrigerant tank 34. When the solution-level detection sensor W has detected that water has been accumulated in a predetermined quantity, the electromagnetic valve V3 is closed. When the pump P2 is operated, water is supplied from the condenser 30 to the double-tube unit 40 at a predetermined flow rate. Thus, water is dripped through water supplying nozzles on the water-receiving pan 44, and then sprayed along the outer surface of the cold-water tube 41 through the plural spraying openings formed in the water-receiving pan 44. Since the structure is arranged such that water is a predetermined quantity is supplied by the pump P2, water in a predetermined quantity can uniformly be sprayed through the plural spraying openings regardless of change in the pressure.

Water sprayed to the outer surface of the cold-water tube 41 is evaporated when water flows downwards so that heat corresponding to heat of vaporization is derived from circulating water which flows in the cold-water tube 41. Thus, circulating water is cooled. In an interior unit (not shown), the cooling operation is performed by using circulating water which is circulated through the cold-water tube 41. Evaporated steam is immediately absorbed by the high-concentration solution which downwards flow along the inner surface of the outer tube 42. At this time, the high-concentration solution generates heat of absorption on the inner surface of the outer tube 42. However, the heat is cooled with air supplied from the fan (not shown). The lithium bromide solution, the concentration of which has been lowered because of absorption of steam, is accumulated in the solution retainer 46. Then, the lithium bromide solution flows to the dilute-solution tank 51. Water which has not been evaporated is accumulated in the refrigerant retainer 48, and then again supplied to the water-receiving pan 44 because of the operation of the pump P2. Thus, water is sprayed.

If the temperature detected by the temperature sensor T2 is lower than the reference level, the electromagnetic valve V4 is opened to supply water in the refrigerant tank 34 to the double-tube unit 40 by the pump P2. Thus, the quantity of water in the refrigerant tank 34 is reduced. At a moment in time at which the solution-level detection sensor W has detected reduction in water to the predetermined level, the electromagnetic valve V4 is closed. Since the quantity of water in the refrigerant tank 34 is reduced as described above, the average concentration of the lithium bromide solution can be lowered. Since water discharged from the refrigerant tank 34 is sprayed to the outer surface of the cold-water tube 41 so as to be evaporated, a refrigerating effect can be obtained. As a result, energy can effectively be used as compared with a structure in which simple mixture with absorbing solution is performed. At a moment in time at which the temperature detected by the temperature sensor T2 has exceeded the reference level, the electromagnetic valve V3 is opened. Thus, water supplied from the condenser 30 is accumulated. At a moment in time at which the solution-level detection sensor W has detected enlargement of water to the predetermined quantity, the electromagnetic valve V3 is closed.

After the operation of the absorption refrigerator has been interrupted, the overall quantity of the electromagnetic valve V5 is opened to supply water in the refrigerant tank 34 to the dilute-solution tank 51 through the diluting passage 35. Then, the pump P1 is operated so that water is circulated. Thus, a diluting operation is performed such that the concentration of the lithium bromide solution in the apparatus is lowered to prevent crystallization even if the temperature of the solution is lowered.

As described above, the absorption refrigerator according to this embodiment is able to reduce the size thereof by integrating the evaporator and the absorber with the double-tube unit 40. Moreover, water in a quantity not smaller than a quantity which can be evaporated is sprayed. Water which has not been evaporated is circulated so as to repeatedly be sprayed. The wettability on the outer surface of the circulating tube can be improved and the heating area can effectively be used. As a result, a great allowance is not required to design the apparatus which is capable of obtaining a satisfactorily large amount of evaporation. Thus, the size of the double-tube unit 40 can furthermore be reduced while energy is used effectively. In consequence, the size of the apparatus can furthermore be reduced. Since direct contact of the lithium bromide solution in the solution retainer 46 with the cold-water tube 41 is prevented, heat of the lithium bromide solution cannot easily be conducted to the cold-water tube 41. Thus, deterioration in the cooling efficiency can be prevented. Since direct contact of the lithium bromide solution in the solution retainer 46 with the refrigerant retainer 48 is prevented, heat of the lithium bromide solution cannot easily be conducted from water in the refrigerant retainer 48 to the cold-water tube 41. Moreover, evaporation of water in the refrigerant retainer 48 is prevented so that deterioration in the refrigerant efficiency is prevented.

Since the structure is arranged such that water supplied from the condenser 30, the refrigerant tank 34 and the refrigerant retainer 48 is supplied to the water-receiving pan 44 by the pump P2, the necessity of providing a plurality of pumps can be eliminated. Therefore, the cost can be reduced. In addition, since the common pump P2 is used to control the flow rate, water in a predetermined quantity can uniformly be sprayed through the plural spraying openings. Since water is accumulated in the refrigerant tank 34 to change the average concentration of the lithium bromide solution, the operation can be performed even if the concentration is at a high level at which the lithium bromide is not crystallized. Therefore, the cooling efficiency can be improved. Since the structure is arranged such that water in the refrigerant tank 34 is sprayed to the cold-water tube 41 to obtain the refrigerating effect, energy can effectively be used.

Although this embodiment has the structure that the quantity of water in the refrigerant tank 34 is changed to two steps in accordance with the temperature of the low-concentration solution, the present invention is not limited to this. For example, the quantity of water may be changed to various steps or changed continuously. The change is not limited to be performed in accordance with the temperature of the low-concentration solution. For example, the quantity may be changed in accordance with the temperature of outer air.

Although this embodiment is arranged to perform only the cooling operation, the present invention is not limited to this. For example, a heating operation may be performed by switching the spraying positions of water and the lithium bromide solution in the double-tube unit 40.

Although this embodiment has the structure that the refrigerant is water and the absorbing solution is the lithium bromide solution, the present invention is not limited to this.

Since the absorption refrigerator according to the present invention has the structure that the evaporator and the absorber are integrated with each other by employing the double-tube structure, the size of the apparatus can be reduced. Since water in a quantity not smaller than a quantity which can be evaporated is sprayed and water which has not been evaporated is circulated so as to be repeatedly sprayed, the heating area can effectively be used while the wettability on the outer surface of the circulating tube is improved. Therefore, a great allowance is not required to design the apparatus which is capable of obtaining a satisfactorily large amount of evaporation. In consequence, the size of the apparatus can furthermore be reduced while energy is effectively used.

Since the absorption refrigerator according to the present invention is structured such that the contact of the absorbing solution with the circulating tube is prevented, deterioration in the cooling efficiency can be prevented despite a simple structure.

Since the absorption refrigerator according to the present invention is structured such that the contact of the absorbing solution with the refrigerant retainer is prevented, deterioration in the cooling efficiency can be prevented with a simple structure.

Since the absorption refrigerator according to the present invention is structured such that the pump for supplying the liquid refrigerant in the refrigerant retainer is operated to supply the liquid refrigerant condensed by a condenser to the refrigerant-spraying unit, the necessity of providing a plurality of pumps can be eliminated. Therefore, the structure can be simplified and the cost can be reduced. Since the common pump controls the flow rate, the quantity of spray which is performed by the refrigerant-spraying unit can be stabilized.

Since the absorption refrigerator according to the present invention is structured such that the liquid refrigerant in the refrigerant tank is supplied to the refrigerant-spraying unit so as to be evaporated, the refrigerating effect can be obtained and thus energy can effectively be used.

Since the absorption refrigerator according to the present invention has a structure that the common pump is employed, the structure can be simplified and the cost can be reduced. Since the common pump controls the flow rate, the quantity of spray which is performed by the refrigerant-spraying unit can be stabilized.

Although the invention has been described in its preferred form with a certain degree of particularity, it is understood that the present disclosure of the preferred form can be changed in the details of construction and in the combination and arrangement of parts without departing from the spirit and the scope of the invention.

What is claimed is:

1. An absorption refrigerator incorporating:

a circulating tube for circulating a heat medium;

an outer tube disposed coaxially with a portion of an outer surface of said circulating tube;

a refrigerant-spraying unit for spraying liquid refrigerant to the outer surface of said circulating tube in a chamber formed between said circulating tube and said outer tube; and an absorbing-solution-spraying unit for spraying absorbing solution which absorbs refrigerant to the inner surface of said outer tube in the chamber so that the heat medium which is circulated in said circulating tube is cooled by dint of evaporation of the liquid refrigerant sprayed to the outer surface of said circulating tube, and the absorbing solution sprayed to the inner surface of said outer tube absorbs steam of the refrigerant, said absorption refrigerator comprising:

a refrigerant retainer for accumulating the liquid refrigerant which has not been evaporated despite spray of the liquid refrigerant from said refrigerant-spraying unit such that the liquid refrigerant is not mixed with the absorbing solution, a refrigerant-circulating passage serving as a passage through which the liquid refrigerant in said refrigerant retainer is circulated to said refrigerant-spraying unit; and a pump provided for said refrigerant-circulating passage and arranged to convey the liquid refrigerant to said refrigerant-spraying unit.

2. An absorption refrigerator according to claim 1, further comprising means for preventing contact with said circulating tube so that the contact of the absorbing solution sprayed by said absorbing-solution-spraying unit with said circulating tube is prevented.

3. An absorption refrigerator according to claim 2, further comprising means for preventing contact with said refrigerant retainer so that the contact of the absorbing solution sprayed by said absorbing-solution-spraying unit with said refrigerant retainer is prevented.

4. An absorption refrigerator incorporating:

a circulating tube for circulating a heat medium;

an outer tube disposed coaxially with a portion of an outer surface of said circulating tube;

a refrigerant-spraying unit for spraying liquid refrigerant to the outer surface of said circulating tube in a chamber formed between said circulating tube and said outer tube;

an absorbing-solution-spraying unit for spraying absorbing solution which absorbs refrigerant to the inner surface of said outer tube in the chamber so that the heat medium which is circulated in said circulating tube is cooled by dint of evaporation of the liquid refrigerant sprayed to the outer surface of said circulating tube, and the absorbing solution sprayed to the inner surface of said outer tube absorbs steam of the refrigerant, said absorption refrigerator comprising:

a refrigerant retainer for accumulating the liquid refrigerant which has not been evaporated despite spray of the liquid refrigerant from said refrigerant-spraying unit such that the liquid refrigerant is not mixed with the absorbing solution, a refrigerant-circulating passage serving as a passage through which the liquid refrigerant in said refrigerant retainer is circulated to said refrigerant-spraying unit;

a pump provided for said refrigerant-circulating passage and arranged to convey the liquid refrigerant to said refrigerant-spraying unit; and said pump is also employed as a power source for conveying the liquid refrigerant condensed and generated by a condenser to said refrigerant-spraying unit.

5. An absorption refrigerator according to claim 1, further comprising:

a refrigerant tank for separating a portion of the liquid refrigerant condensed and generated by said condenser from an absorbing operation cycle so as to accumulate the portion of the liquid refrigerant; and supply means which supplies the liquid refrigerant in said refrigerant tank to said refrigerant-spraying unit so as to return the liquid refrigerant to the absorbing operation cycle.

6. An absorption refrigerator incorporating:

a circulating tube for circulating a heat medium;

an outer tube disposed coaxially with a portion of an outer surface of said circulating tube;

a refrigerant-spraying unit for spraying liquid refrigerant to the outer surface of said circulating tube in a chamber formed between said circulating tube and said outer tube;

an absorbing-solution-spraying unit for spraying absorbing solution which absorbs refrigerant to the inner surface of said outer tube in the chamber so that the heat medium which is circulated in said circulating tube is cooled by dint of evaporation of the liquid refrigerant sprayed to the outer surface of said circulating tube, and the absorbing solution sprayed to the inner surface of said outer tube absorbs steam of the refrigerant, said absorption refrigerator comprising:

a refrigerant retainer for accumulating the liquid refrigerant which has not been evaporated despite spray of the liquid refrigerant from said refrigerant-spraying unit such that the liquid refrigerant is not mixed with the absorbing solution, a refrigerant-circulating passage serving as a passage through which the liquid refrigerant in said refrigerant retainer is circulated to said refrigerant-spraying unit;

a pump provided for said refrigerant-circulating passage and arranged to convey the liquid refrigerant to said refrigerant-spraying unit;

said pump is also employed as a power source for said supply means;

a refrigerant tank for separating a portion of the liquid refrigerant condensed and generated by said condenser from an absorbing operation cycle so as to accumulate the portion of the liquid refrigerant; and supply means which supplies the liquid refrigerant in said refrigerant tank to said refrigerant-spraying unit so as to return the liquid refrigerant to the absorbing operation cycle.

7. An absorption refrigerator incorporating:

a circulating tube for circulating a heat medium;

an outer tube disposed coaxially with a portion of an outer surface of said circulating tube;

a refrigerant-spraying unit for spraying liquid refrigerant to the outer surface of said circulating tube in a chamber formed between said circulating tube and said outer tube;

an absorbing-solution-spraying unit for spraying absorbing solution which absorbs refrigerant to the inner surface of said outer tube in the chamber so that the heat medium which is circulated in said circulating tube is cooled by dint of evaporation of the liquid refrigerant sprayed to the outer surface of said circulating tube, and the absorbing solution sprayed to the inner surface of said outer tube absorbs steam of the refrigerant, said absorption refrigerator comprising:

a refrigerant retainer for accumulating the liquid refrigerant which has not been evaporated despite spray of the liquid refrigerant from said refrigerant-spraying unit such that the liquid refrigerant is not mixed with the absorbing solution, a refrigerant-circulating passage serving as a passage through which the liquid refrigerant in said refrigerant retainer is circulated to said refrigerant-spraying unit;

a pump provided for said refrigerant-circulating passage and arranged to convey the liquid refrigerant to said refrigerant-spraying unit;

means for preventing contact with said circulating tube so that the contact of the absorbing solution sprayed by said absorbing-solution-spraying unit with said circulating tube is prevented; and said pump is also employed as a power source for conveying the liquid refrigerant condensed and generated by a condenser to said refrigerant-spraying unit.

8. An absorption refrigerator incorporating:

a circulating tube for circulating a heat medium;

an outer tube disposed coaxially with a portion of an outer surface of said circulating tube;

a refrigerant-spraying unit for spraying liquid refrigerant to the outer surface of said circulating tube in a chamber formed between said circulating tube and said outer tube;

an absorbing-solution-spraying unit for spraying absorbing solution which absorbs refrigerant to the inner surface of said outer tube in the chamber so that the heat medium which is circulated in said circulating tube is cooled by dint of evaporation of the liquid refrigerant sprayed to the outer surface of said circulating tube, and the absorbing solution sprayed to the inner surface of said outer tube absorbs steam of the refrigerant, said absorption refrigerator comprising:

a refrigerant retainer for accumulating the liquid refrigerant which has not been evaporated despite spray of the liquid refrigerant from said refrigerant-spraying unit such that the liquid refrigerant is not mixed with the absorbing solution, a refrigerant-circulating passage serving as a passage through which the liquid refrigerant in said refrigerant retainer is circulated to said refrigerant-spraying unit;

a pump provided for said refrigerant-circulating passage and arranged to convey the liquid refrigerant to said refrigerant-spraying unit;

means for preventing contact with said circulating tube so that the contact of the absorbing solution sprayed by said absorbing-solution-spraying unit with said circulating tube is prevented;

means for preventing contact with said refrigerant retainer so that the contact of the absorbing solution sprayed by said absorbing-solution-spraying unit with said refrigerant retainer is prevented; and said pump is also employed as a power source for conveying the liquid refrigerant condensed and generated by a condenser to said refrigerant-spraying unit.

9. An absorption refrigerator according to claim 2, further comprising:

a refrigerant tank for separating a portion of the liquid refrigerant condensed and generated by said condenser from an absorbing operation cycle so as to accumulate the portion of the liquid refrigerant; and supply means which supplies the liquid refrigerant in said refrigerant tank to said refrigerant-spraying unit so as to return the liquid refrigerant to the absorbing operation cycle.

10. An absorption refrigerator according to claim 3, further comprising:

a refrigerant tank for separating a portion of the liquid refrigerant condensed and generated by said condenser from an absorbing operation cycle so as to accumulate the portion of the liquid refrigerant; and supply means which supplies the liquid refrigerant in said refrigerant tank to said refrigerant-spraying unit so as to return the liquid refrigerant to the absorbing operation cycle.

11. An absorption refrigerator incorporating:

a circulating tube for circulating a heat medium;

an outer tube disposed coaxially with a portion of an outer surface of said circulating tube;

a refrigerant-spraying unit for spraying liquid refrigerant to the outer surface of said circulating tube in a chamber formed between said circulating tube and said outer tube;

an absorbing-solution-spraying unit for spraying absorbing solution which absorbs refrigerant to the inner surface of said outer tube in the chamber so that the heat medium which is circulated in said circulating tube is cooled by dint of evaporation of the liquid refrigerant sprayed to the outer surface of said circulating tube, and the absorbing solution sprayed to the inner surface of said outer tube absorbs steam of the refrigerant, said absorption refrigerator comprising:

a refrigerant retainer for accumulating the liquid refrigerant which has not been evaporated despite spray of the liquid refrigerant from said refrigerant-spraying unit such that the liquid refrigerant is not mixed with the absorbing solution, a refrigerant-circulating passage serving as a passage through which the liquid refrigerant in said refrigerant retainer is circulated to said refrigerant-spraying unit;

a pump provided for said refrigerant-circulating passage and arranged to convey the liquid refrigerant to said refrigerant-spraying unit;

said pump is also employed as a power source for conveying the liquid refrigerant condensed and generated by a condenser to said refrigerant-spraying unit;

a refrigerant tank for separating a portion of the liquid refrigerant condensed and generated by said condenser from an absorbing operation cycle so as to accumulate the portion of the liquid refrigerant; and supply means which supplies the liquid refrigerant in said refrigerant tank to said refrigerant-spraying unit so as to return the liquid refrigerant to the absorbing operation cycle.

* * * * *